United States Patent
Lathrop, III et al.

(10) Patent No.: US 6,320,960 B1
(45) Date of Patent: Nov. 20, 2001

(54) HEADSET WITH ADJUSTABLE EARPIECE

(75) Inventors: Robert L. Lathrop, III, Santa Clara; Richard J. Lutzinger, Fremont; Kenneth G. Olson, Los Gatos; John H. Magnasco, San Jose, all of CA (US)

(73) Assignee: Hello Direct, Inc., San Jose, CA (US)

( * ) Notice: Subject to any disclaimer, the term of this patent is extended or adjusted under 35 U.S.C. 154(b) by 0 days.

(21) Appl. No.: 09/405,486

(22) Filed: Sep. 24, 1999

Related U.S. Application Data

(60) Provisional application No. 60/101,838, filed on Sep. 25, 1998.

(51) Int. Cl.⁷ .................................................. H04M 1/00
(52) U.S. Cl. .......................................................... 379/430
(58) Field of Search ............................ 379/430; 381/327, 381/330, 381, 376, 379; 455/568

(56) References Cited

U.S. PATENT DOCUMENTS

| | | | |
|---|---|---|---|
| D. 263,043 | 2/1982 | Petrie | D14/36 |
| D. 291,197 | 8/1987 | LaLanne | D14/36 |
| D. 317,610 | 6/1991 | Jahnke | D14/223 |
| D. 318,053 | 7/1991 | Ludeke et al. | D14/206 |
| D. 318,669 | 7/1991 | Nakayama | D14/205 |
| D. 319,241 | 8/1991 | Daido et al. | D14/205 |
| D. 327,888 | 7/1992 | Fitzgerald | D14/147 |
| D. 331,057 | 11/1992 | Isonaga | D14/205 |
| D. 331,059 | 11/1992 | Sogabe et al. | D14/205 |
| D. 331,408 | 12/1992 | Ellermeier | D14/205 |
| D. 333,137 | 2/1993 | Burke | D14/206 |
| D. 340,722 | 10/1993 | Bungardt | D14/242 |
| D. 344,730 | 3/1994 | Gattey et al. | D14/206 |
| D. 345,162 | 3/1994 | Yamatogi | D14/205 |
| D. 350,354 | 9/1994 | Nakamura | D14/205 |
| D. 351,958 | 11/1994 | Ostroff | D14/205 |
| D. 353,379 | 12/1994 | Nakamura | D14/223 |
| D. 357,479 | 4/1995 | Coomans | D14/223 |
| D. 358,388 | 5/1995 | Nakamura et al. | D14/205 |
| D. 358,391 | 5/1995 | Isono | D14/205 |
| D. 361,066 | 8/1995 | Langhorn et al. | D14/142 |
| D. 363,487 | 10/1995 | Thurnau | D14/224 |
| D. 366,486 | 1/1996 | Runquist et al. | D14/206 |
| D. 368,716 | 4/1996 | Shudo | D14/205 |
| D. 371,133 | 6/1996 | Andrea | D14/206 |
| D. 372,473 | 8/1996 | Bungardt | D14/149 |
| D. 372,480 | 8/1996 | Bungardt | D14/247 |
| D. 374,011 | 9/1996 | Baxter | D14/206 |

(List continued on next page.)

FOREIGN PATENT DOCUMENTS

| | | | |
|---|---|---|---|
| 0 690 654 A2 | 1/1996 | (EP) | H04R/1/08 |
| 04319841 | 11/1992 | (JP) | H04M/1/05 |
| 05079855 | 3/1993 | (JP) | G01D/5/36 |
| WO 97/27721 | 7/1997 | (WO) | H04R/1/10 |

*Primary Examiner*—Jack Chiang
(74) *Attorney, Agent, or Firm*—Haverstock & Owens LLP

(57) ABSTRACT

A headset has an earpiece and a flexible microphone boom. The headset is designed and constructed to be lightweight, flexibly adjustable, and comfortable to wear. The earpiece fits comfortably over an external portion of an ear of a wearer and between a head of the wearer and the ear. The earpiece is designed to be easily adjusted for a secure, comfortable fit. In the preferred embodiment, the earpiece includes a rigid plastic backbone and a ductile wire. In an alternate embodiment, the earpiece includes a rigid plastic backbone, a spring, and a ductile wire. The earpiece has an asymmetrical U shape, facilitating easy adjustment to fit securely around the external portion of the ear. A speaker module is coupled to the earpiece and designed to rest over a pinna of the ear when the earpiece is worn over the ear. A small speaker is mounted inside the speaker module. The speaker module is coupled to the earpiece by a ball and socket joint integrally formed as part of the earpiece. A speaker cushion is configured to fit over the speaker module and has a lip which fits within a groove of the speaker module. The speaker cushion is compressible to facilitate stably positioning the speaker module against the pinna.

20 Claims, 7 Drawing Sheets

U.S. PATENT DOCUMENTS

| | | | |
|---|---|---|---|
| D. 375,313 | 11/1996 | Jensen et al. | D14/206 |
| D. 375,500 | 11/1996 | Bungardt et al. | D14/223 |
| D. 375,959 | 11/1996 | Davis et al. | D14/223 |
| D. 376,362 | 12/1996 | Bozorgi-Ram | D14/205 |
| D. 376,598 | 12/1996 | Hayashi | D14/206 |
| D. 377,020 | 12/1996 | Bungardt et al. | D14/205 |
| D. 379,990 | 6/1997 | Bungardt et al. | D14/228 |
| D. 381,336 | 7/1997 | Bungardt et al. | D14/205 |
| D. 381,646 | 7/1997 | Taylor et al. | D14/124 |
| D. 381,987 | 8/1997 | Tsuge | D14/205 |
| D. 384,958 | 10/1997 | Shudo | D14/206 |
| D. 385,272 | 10/1997 | Jensen et al. | D14/142 |
| 844,299 | 2/1907 | Challen . | |
| 1,489,978 | 4/1924 | Byron . | |
| 1,624,144 | 4/1927 | Mathieu . | |
| 1,846,231 | 2/1932 | Susman . | |
| 2,353,070 | 7/1944 | Pitkin, Jr. . | |
| 2,964,596 | 12/1960 | Christensen . | |
| 4,020,297 | 4/1977 | Brodie | 179/156 A |
| 4,273,969 | 6/1981 | Foley et al. | 179/156 A |
| 4,335,281 | 6/1982 | Scott et al. | 179/156 A |
| 4,403,120 | 9/1983 | Yoshimi | 179/182 R |
| 4,417,104 | 11/1983 | Langer | 179/107 R |
| 4,484,029 | 11/1984 | Kenney | 179/2 EA |
| 4,572,324 | 2/1986 | Fidi et al. | 181/129 |
| 4,689,822 | 8/1987 | Houng | 381/183 |
| 4,875,233 | 10/1989 | Derhaag et al. | 379/430 |
| 4,893,344 | 1/1990 | Tragardh et al. | 381/187 |
| 4,917,504 | 4/1990 | Scott et al. | 381/187 |
| 4,972,468 | 11/1990 | Murase et al. | 379/430 |
| 4,972,492 | 11/1990 | Tanaka et al. | 381/187 |
| 5,033,094 | 7/1991 | Hung | 381/183 |
| 5,117,465 | 5/1992 | MacDonald | 381/187 |
| 5,206,997 | 5/1993 | Cunningham | 30/120.4 |
| 5,210,792 | 5/1993 | Kajihara | 379/430 |
| 5,381,486 | 1/1995 | Ludeke et al. | 381/187 |
| 5,412,736 | 5/1995 | Keliiliki | 381/187 |
| 5,414,769 | 5/1995 | Gattey et al. | 379/430 |
| 5,438,626 | 8/1995 | Neuman et al. | 381/183 |
| 5,446,788 | 8/1995 | Lucey et al. | 379/430 |
| 5,448,637 | 9/1995 | Yamaguchi et al. | 379/430 |
| 5,450,496 | 9/1995 | Burris et al. | 381/183 |
| 5,459,290 | 10/1995 | Yamagishi | 181/129 |
| 5,469,505 | 11/1995 | Gattey et al. | 379/430 |
| 5,504,812 | 4/1996 | Vangarde | 379/430 |
| 5,528,689 | 6/1996 | Chan | 379/430 |
| 5,533,122 | 7/1996 | Gattey et al. | 379/430 |
| 5,551,090 | 9/1996 | Thompson | 2/209 |
| 5,581,622 | 12/1996 | Sakurai | 381/183 |
| 5,590,213 | 12/1996 | Urella et al. | 381/183 |
| 5,640,458 | 6/1997 | Nishiguchi et al. | 381/74 |
| 5,655,026 | 8/1997 | Peters et al. | 381/187 |
| 5,694,467 | 12/1997 | Young, III | 379/430 |
| 5,757,944 | 5/1998 | Jensen et al. | 381/187 |
| 5,761,298 | 6/1998 | Davis et al. | 379/430 |
| 5,764,778 | 6/1998 | Zurek | 381/68 |
| 5,787,166 | 7/1998 | Ullman | 379/430 |

HEADSET WITH ADJUSTABLE EARPIECE

RELATED APPLICATION

This Patent Application claims the benefit of U.S. Provisional Application No. 60/101,838, filed Sep. 25, 1998.

FIELD OF THE INVENTION

The present invention relates to the field of headsets. More specifically, the present invention relates to the field of over-the-ear headsets.

BACKGROUND OF THE INVENTION

Many persons spend a large amount of time on the telephone and it is still a common practice for a person to hold the receiver against the shoulder when using the phone so the person's hands are available for writing or typing. Telephone communications headsets have been developed to overcome this problem and are well known in the art. Most of these prior art telephone communications headsets include an over-the-head band designed to be worn over a wearer's head for positioning a pair of speakers adjacent to each of the wearer's ears. One major problem with this type of prior art headset is the fact that when this headset is worn, the wearer cannot hear anything else since the speakers are positioned adjacent to both ears. Additionally, these prior art headsets are generally uncomfortable, and some of these prior art headsets often become dislodged if the wearer moves his head back and forth. Accordingly, more recent prior art telephone communications headsets have been designed to be worn around a single outer ear of a wearer for positioning a single earphone against either one of the wearer's ears, depending upon which side the headset is configured for wearing. One such prior art telephone communications headset is described in U.S. Pat. No. 5,446,788, issued to Lucey et al.

U.S. Pat. No. 5,446,788 discloses an adjustable telephone headset which includes a boom microphone, an earphone speaker, and an ear support constructed and arranged to be adjustable. The adjustable telephone headset is configured with an adjustable ear support portion which is designed to fit around the ear of a user for holding the headset in place and positioning the earphone speaker against the wear's outer ear. The ear support portion includes a fixed curvilinear portion and a hollow adjustable curvilinear member having an engagement portion for engaging a metal shaft of the fixed curvilinear portion. When engaged, the hollow adjustable curvilinear member can rotate about the metal shaft of the fixed curvilinear portion, thereby allowing the ear support to be adjusted. A rotation tab and rotation tab recess limit the degree of rotation about the metal shaft and thus the degree of adjustment available.

A major problem with this adjustable telephone headset is that it may fit poorly around the wearer's ear. The fixed curvilinear portion and the hollow adjustable curvilinear member are both rigid structures and the design only permits adjustment by allowing one rigid member to rotate about a metal shaft of the other rigid member. Accordingly, the ear support may not fit comfortably around the wearer's ear. If the adjustable telephone headset does not fit properly it will fall off if the wearer moves his head. Another problem with this headset is the positioning of the earphone speaker against the wearer's ear. This placement is not ideal and can often cause discomfort as the wearer moves his head and the ear rubs against the earphone speaker.

Accordingly, what is needed is a lightweight over-the-ear headset which is comfortable to wear, is adjustable to enable appropriate positioning over the ear, and is stably positionable against the ear.

SUMMARY OF THE INVENTION

A headset has an earpiece and a flexible microphone boom. The headset is designed and constructed to be lightweight, flexibly adjustable, and comfortable to wear. The earpiece fits comfortably over an external portion of an ear of a wearer and between a head of the wearer and the ear. The earpiece is designed to be easily adjusted for a secure, comfortable fit. In the preferred embodiment, the earpiece includes a rigid plastic backbone and a ductile wire. In an alternate embodiment, the earpiece includes a rigid plastic backbone, a spring, and a ductile wire. The earpiece has an asymmetrical U shape, facilitating easy adjustment to fit securely around the external portion of the ear. A first elastomer provides additional comfort and adjustability to the earpiece.

A speaker module is coupled to the earpiece and designed to rest over a pinna of the ear when the earpiece is worn over the ear. The speaker module is preferably ovular in shape and has a flat cover and a curved cover. The flat cover and the curved cover are coupled together, where a groove is formed along a circumferential edge between the flat cover and the curved cover. A small speaker is mounted inside the speaker module and faces an inner surface of the flat cover. The flat cover is configured with tiny openings to allow sound to pass from the small speaker through the flat cover of the speaker module.

The speaker module is coupled to the earpiece by a ball and socket joint integrally formed as part of the earpiece. This allows the speaker module to be rotated to allow the headset to be worn over either ear. The ball and socket joint design allows the speaker module to be easily maneuvered against the pinna.

A speaker cushion is configured to fit over the flat cover and has a lip which fits within the groove of the speaker module. The speaker cushion is compressible to facilitate stably positioning the speaker module against the pinna. The speaker cushion further includes a positioning notch and a raised surface for resting against the ear. The raised surface forms a compressible cavity between the flat cover and the raised surface. Additionally, the raised surface includes one or more apertures for directing sound into the ear.

DETAILED DESCRIPTION OF THE PREFERRED EMBODIMENT

Although the description of the headset of the present invention will focus on a headset configured to couple to a telephone, the description is equally applicable to a headset configured to couple to other electrical devices, e.g., a communication device generating electrical signals corresponding to sound waves.

The present invention includes a headset having an earpiece and further including a flexible microphone boom coupled to the earpiece. The earpiece is designed to fit over an outer portion of an ear of a wearer. An earphone speaker module is coupled to the earpiece and is designed to fit comfortably over a pinna of the ear. The earphone speaker module may be rotated to allow the headset to be worn over either the left ear or the right ear.

Figure 1:
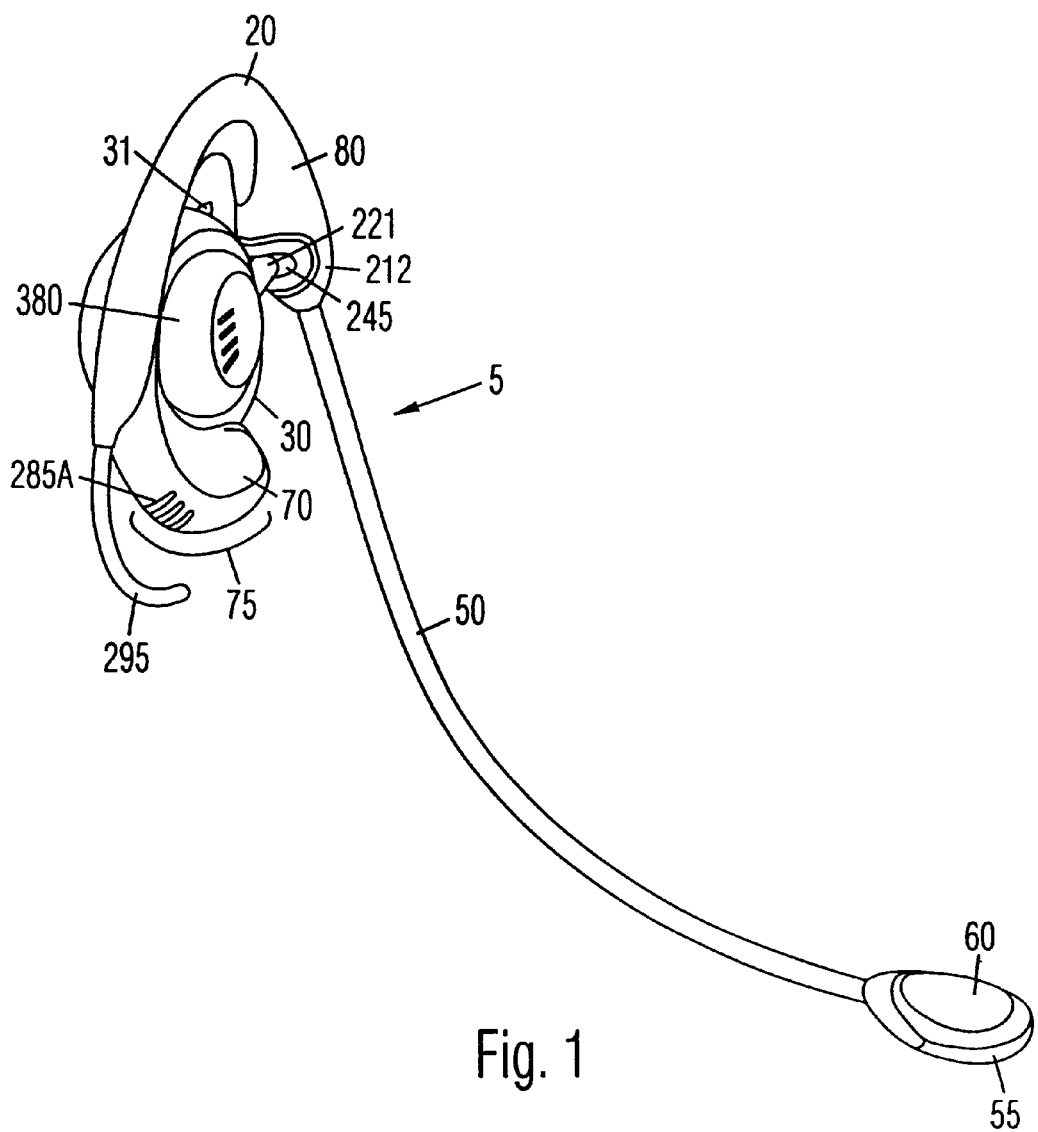
FIG. 1 illustrates a perspective view of the headset according to the preferred embodiment of the present invention.

Referring to FIG. 1, a headset 5 in accordance with the preferred embodiment of the present invention is illustrated. Preferably, the headset includes an earpiece 20 and a speaker module 30. Additionally, the headset includes a flexible microphone boom 50 coupled to the earpiece 20.

The earpiece 20 has an asymmetrical U shape and is configured to rest over the outer portion of the ear and between a head of the wearer and the ear. Moreover, the earpiece 20 is designed to fit comfortably around the outer portion of the ear. In particular, the earpiece 20 is flexible and adjustable such that the wearer is able to appropriately position the earpiece 20 by adjusting the asymmetrical U shape. Preferably, the earpiece 20 includes a supporting portion and a stabilizing portion. The supporting portion includes a first elastomer 70 while the stabilizing portion includes a second elastomer 80, where the second elastomer 80 has a durometer value greater than a durometer value of the first elastomer 70. The durometer value indicates the hardness of an elastomer, where a larger durometer value increases the hardness and rigidity of the elastomer.

In practice, the first elastomer 70 rests against the ear and is bendable to facilitate stably positioning the earpiece 20 on the ear. Moreover, the second elastomer 80 provides resistance against unintended movement of the headset 5 while positioned over the ear.

The speaker module 30 is capable of rotating to allow the headset 5 to be worn over either the left ear or the right ear. Additionally, the speaker module 30 is configured to move perpendicular to the pinna and parallel to the pinna so that the speaker module 30 rests comfortably over the pinna.

The flexible microphone boom 50 is coupled to the earpiece 20 at a first end. Preferably, a microphone (not shown) is enclosed in a hollow shell 55 which is coupled at a second end of the flexible microphone boom 50. The hollow shell 55 is covered on a surface with a foam shield 60 which protrudes outwardly from the surface. The flexible microphone boom 50 is configured to be selectively positionable so that the hollow shell 55 is positioned adjacent to a mouth of the wearer for speaking into the microphone when the headset 5 is properly worn.

Figure 2A:
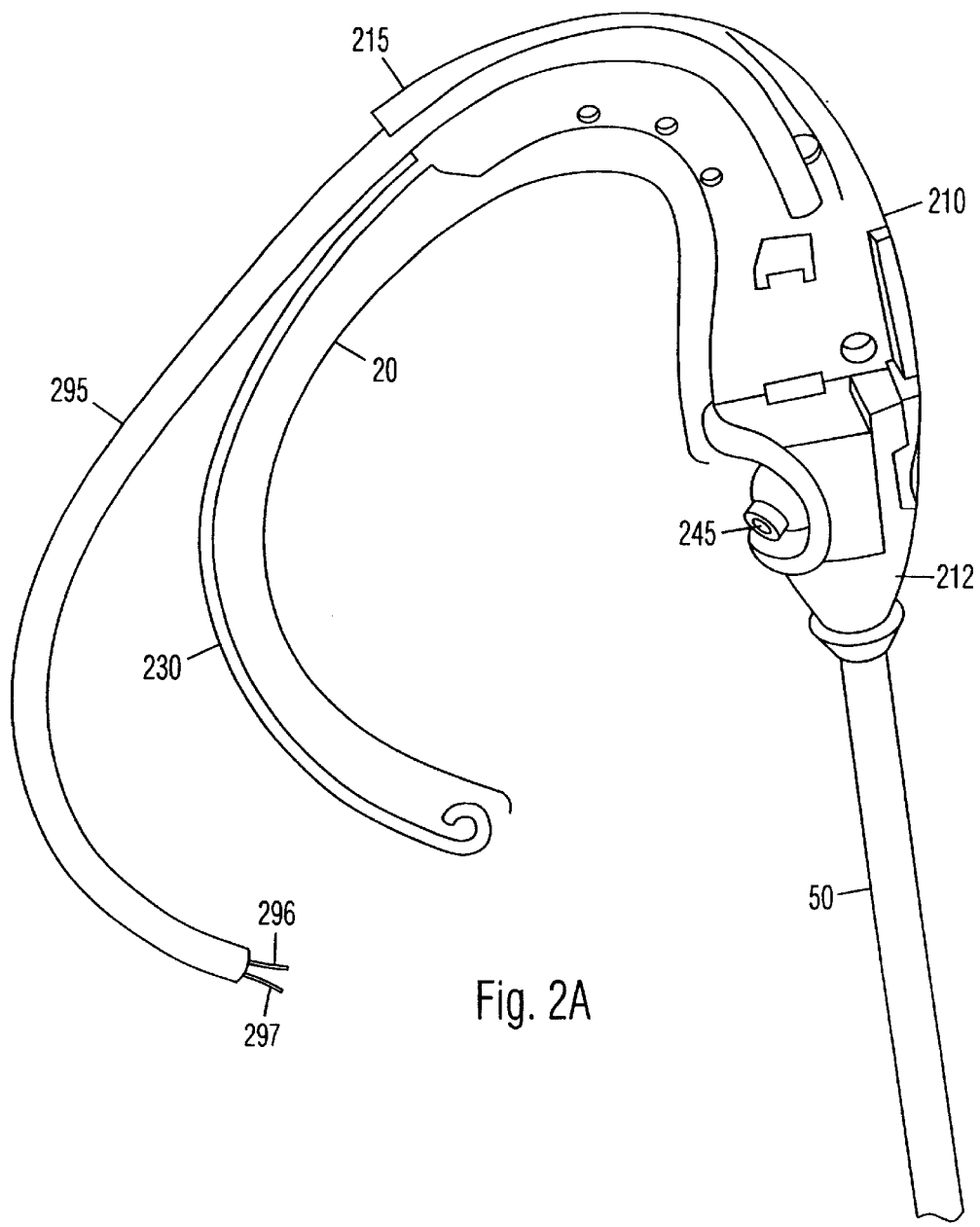
FIG. 2A illustrate the internal structure of the headset according to the preferred embodiment of the present invention.

FIG. 2A illustrates the internal structure of an earpiece of the headset according to the preferred embodiment of the present invention. The earpiece 20 preferably includes a rigid backbone 210 and a ductile wire 230 coupled to the rigid backbone 210.

Figure 2B:
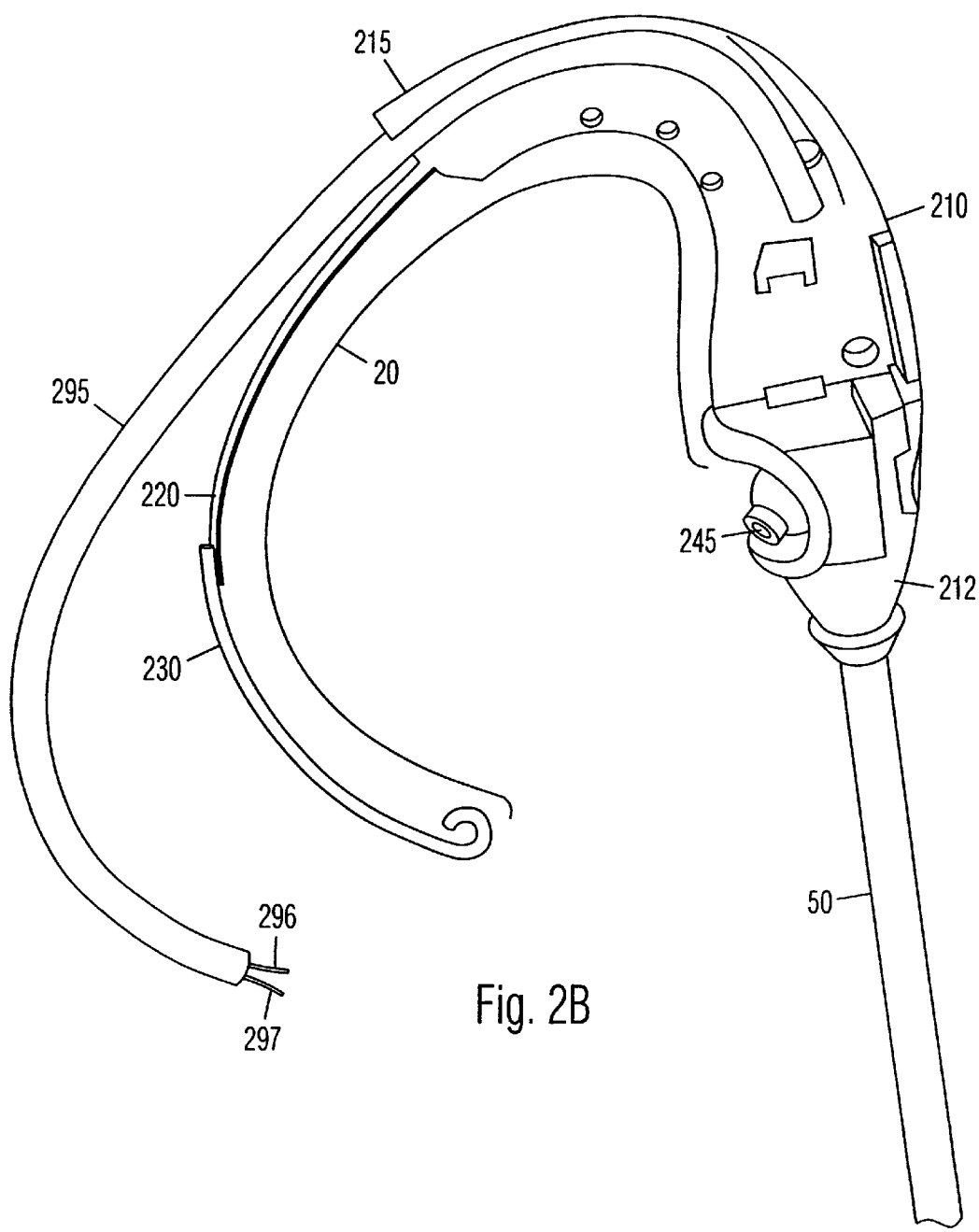
FIG. 2B illustrates the internal structure of the headset according to an alternate embodiment of the present invention.

FIG. 2B illustrates the internal structure of an earpiece of the headset according to an alternate embodiment of the present invention. The earpiece 20 preferably includes a rigid backbone 210, a spring 220 coupled to the rigid backbone 210, and a ductile wire 230 coupled to the spring 220.

The rigid backbone 210 is preferably formed of a polypropylene and is shaped with uniform thickness. Alternatively, the rigid backbone 210 can be composed of any other appropriate material. The rigid backbone 210 has a first end 212 and second end 215, where the second end 215 is formed with an ending curvature of approximately 90 degrees. The rigid backbone 210 is preferably coupled to the ductile wire 230 at the second end 215. Alternatively, the rigid backbone 210 is coupled to the spring 220 at the second end 215 while the spring 220 is coupled to the ductile wire 230.

The flexible microphone boom 50 is coupled to the rigid backbone 210 at the first end 212. An aperture 245 is provided in the rigid backbone 210 for coupling the speaker module 30 to the earpiece 20.

A flexible cabling jacket 295 is coupled to the rigid backbone 210. The flexible cabling jacket 295 includes a first pair of wires 296 coupled to the microphone enclosed in the hollow shell 55 and a second pair of wires 297 coupled to the speaker module 30. The flexible cabling jacket 295 can be terminated with any appropriate connector, e.g., male type or female type. The first pair of wires 296 and the second pair of wires 297 deliver appropriate signals to the microphone and the speaker module 30, respectively.

Figure 3:
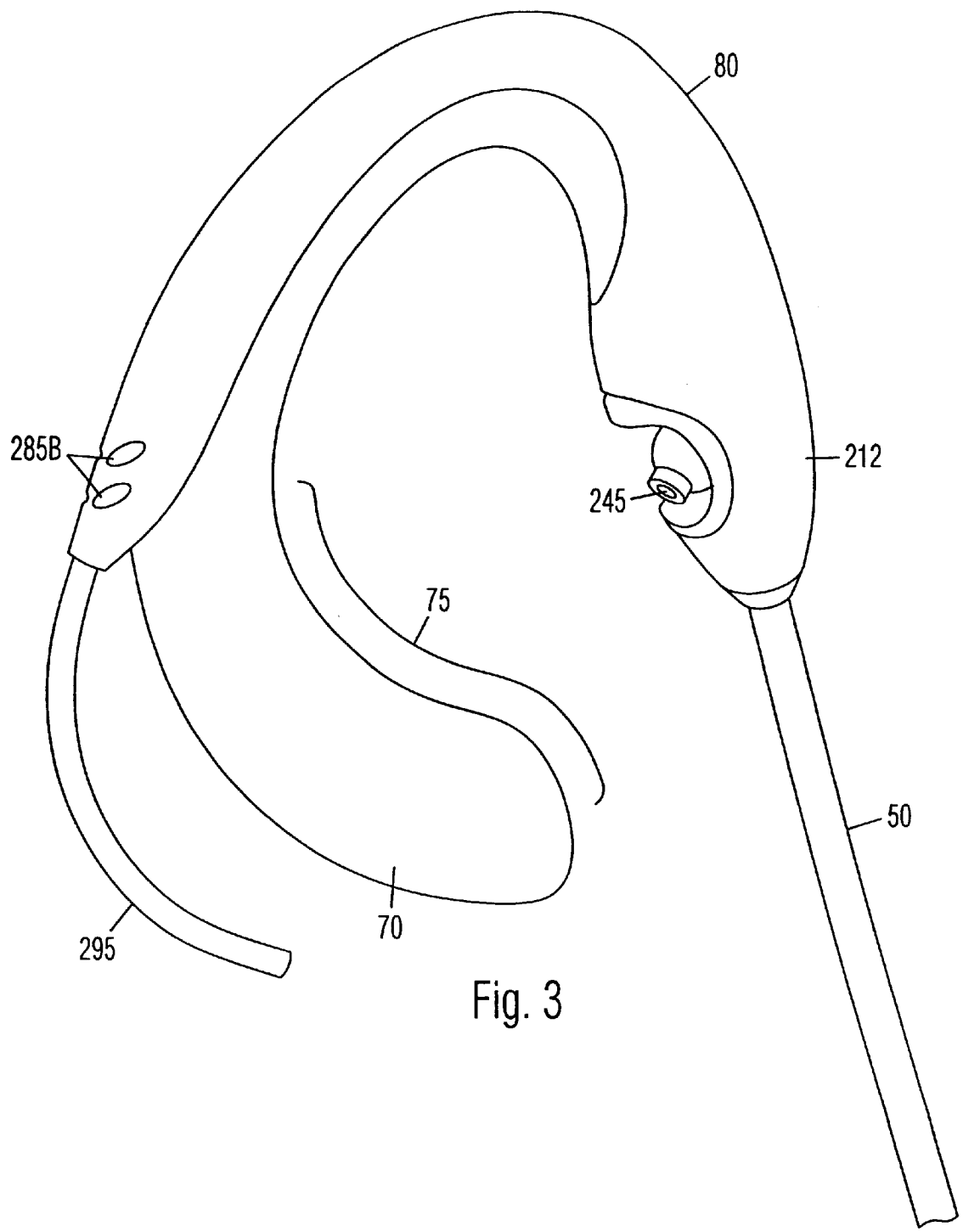
FIG. 3 illustrates the headset according to an alternate embodiment of the present invention.

Referring to FIGS. 1 and 3, in the preferred embodiment the first elastomer 70 is preferably formed over the rigid backbone 210 and the ductile wire 230 of the earpiece 20 to create the asymmetrical U shape. In the alternate embodiment, the first elastomer 70 is formed over the rigid backbone 210, the spring 220, and the ductile wire 230 of the earpiece 20 to create the asymmetrical U shape. The first elastomer 70 has an elongated portion 75 at one end of the asymmetrical U shape for comfortably fitting the first elastomer 70 behind the ear. Due to its flexible design and construction, the earpiece 20 can be easily adjusted to fit any size ear by bending and molding the first elastomer 70 to conform to the contours of the ear to make the headset 5 fit more comfortably and securely over the outer portion of the ear.

The second elastomer 80 is formed over a portion of the asymmetrical U shape of the earpiece. Preferably, the second elastomer 80 completely surrounds the asymmetrical U shape at the second end 212 of the rigid backbone 210, near the flexible microphone boom 50, and curves about the top of the first elastomer 70.

The flexible cabling jacket 295 is coupled to the second elastomer 80 and extends outward from the second elastomer 80.

Both the first elastomer 70 and the second elastomer 80 are configured around the aperture 245 to allow the speaker module 30 to be coupled to the earpiece 20. In the preferred embodiment (FIG. 1), a plurality of strain reliefs 285A are formed on the first elastomer 70. In the alternate embodiment (FIG. 3), a plurality of strain reliefs 285B are formed on the second elastomer 80. The strain reliefs 285A and 285B provide additional flexibility.

Figure 4:
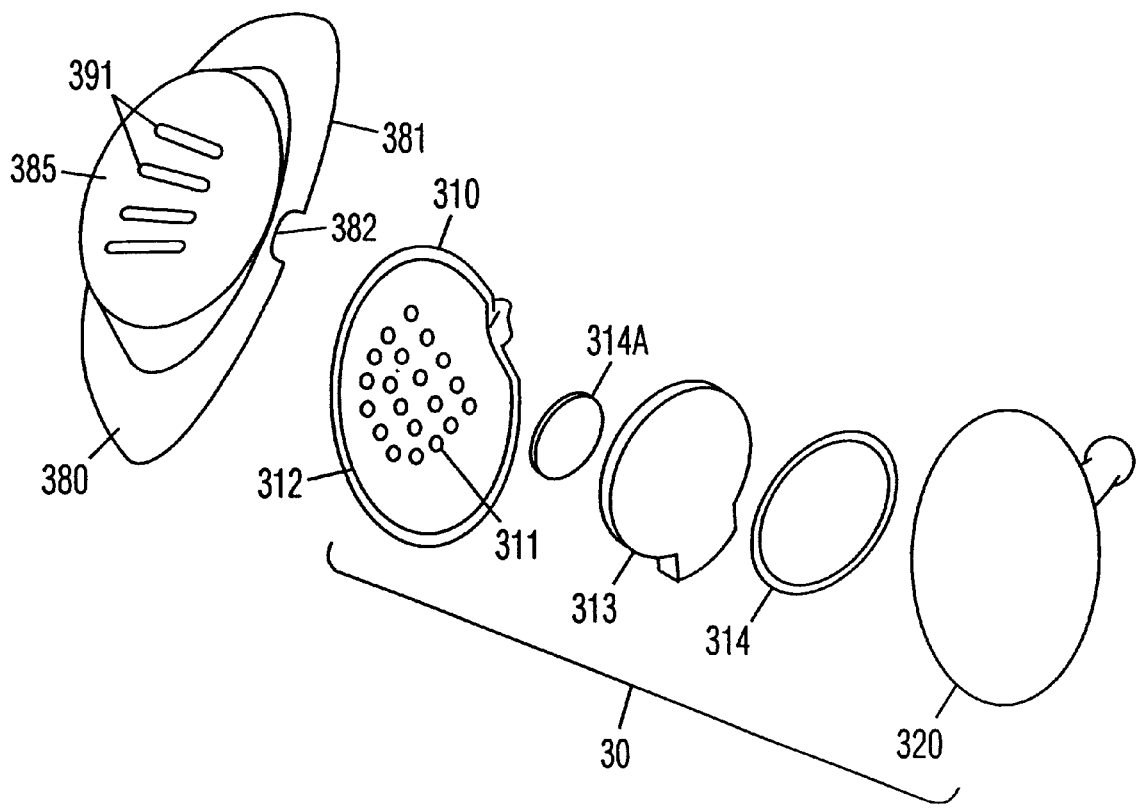
FIG. 4 illustrates the preferred embodiment of the earphone speaker module for the headset of the present invention.

FIGS. 1 and 4 illustrate the preferred embodiment of the speaker module for the headset of the present invention. The speaker module 30 is coupled to the earpiece 20 by a ball and socket joint 221. The ball and socket joint 221 facilitates rotation of the speaker module 30 so that the headset 5 can be positioned over either ear of the wearer. However, the speaker module 30 includes a tab 31 to prohibit 360 degree rotation of the speaker module 30 to prevent damage to one or more electrical connections between the speaker module 30 and the earpiece 20. Additionally, the ball and socket joint 221 facilitates moving the speaker module 30 perpendicular to the pinna between an engaged position against the pinna and a disengaged position away from the pinna. Moreover, the ball and socket joint 221 facilitates moving the speaker module 30 parallel to the pinna. The adjustability of the speaker module 30 permits positioning the speaker module 30 comfortably over the pinna.

The speaker module 30 preferably includes a flat cover 310 and a curved cover 320. Additionally, the speaker module 30 has an ovular shape. A groove 312 is formed along a circumferential edge between the flat cover 310 and the curved cover 320. The flat cover 310 faces the ear when the headset 5 is positioned on the ear and includes a plurality of apertures 311 to permit sound to travel to the ear from the speaker 313. The speaker 313 is mounted between the flat cover 310 and the curved cover 320 such that the speaker 313 faces the inner surface of the flat cover 310. The speaker 313 is mounted with an elastomer gasket 314 and a foam covering 314A.

The groove 312 is designed for enabling a speaker cushion 380 to be secured over the speaker module 30.

The speaker cushion 380 is configured to fit over the flat cover 310 and to direct the sound into the ear. Additionally, the speaker cushion 380 is compressible to facilitate stably positioning the speaker module 30 against the pinna. Preferably, the speaker cushion 380 is materially composed of an elastomeric material. Alternatively, the speaker cushion 380 can be composed of any appropriate material. The speaker cushion 380 preferably includes a lip 381 configured to fit within the groove 312, a positioning notch 382, and a raised surface 385 forming a compressible cavity between the flat cover 310 and the raised surface 385. The raised surface 385 includes one or more apertures 390 for directing sound into the ear. The speaker cushion 380 has an ovular shape.

Figure 5:
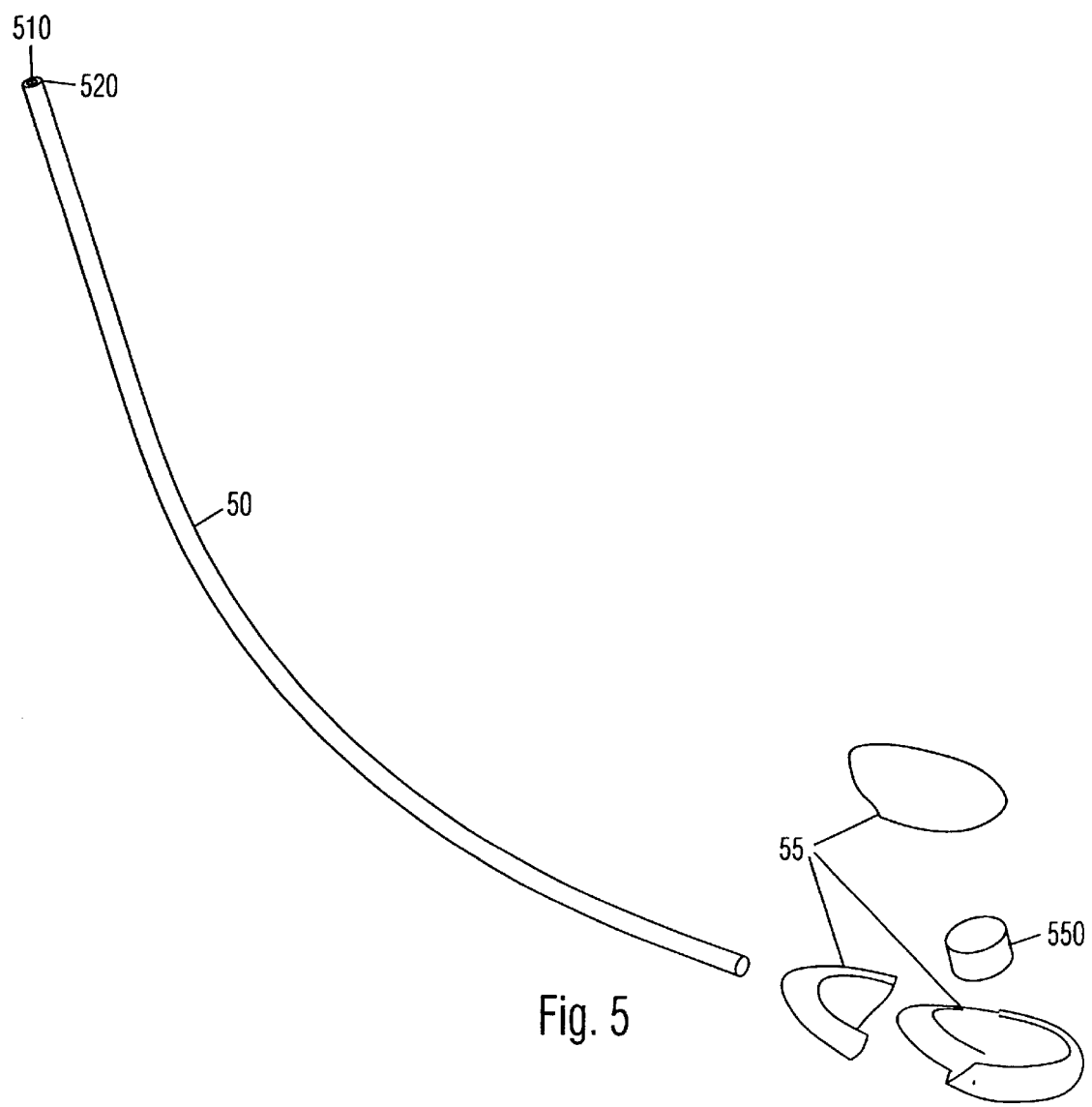
FIG. 5 illustrates a diagram of the preferred embodiment of the flexible microphone boom for the headset of the present invention.

FIG. 5 illustrates a diagram of the preferred embodiment of the flexible microphone boom for the headset of the present invention. As illustrated, the flexible microphone boom 50 includes a flexible metallic core 510 and a soft skin 520. The soft skin 510 is preferably formed of a plastic polymer or, alternatively, any other appropriate material. The flexible microphone boom 50 is bendable such that the microphone 550 can be appropriately positioned next to the mouth of the wearer. The hollow shell 55 is coupled to the flexible microphone boom 50. The microphone 550 is mounted within the hollow shell 55.

Figure 6:
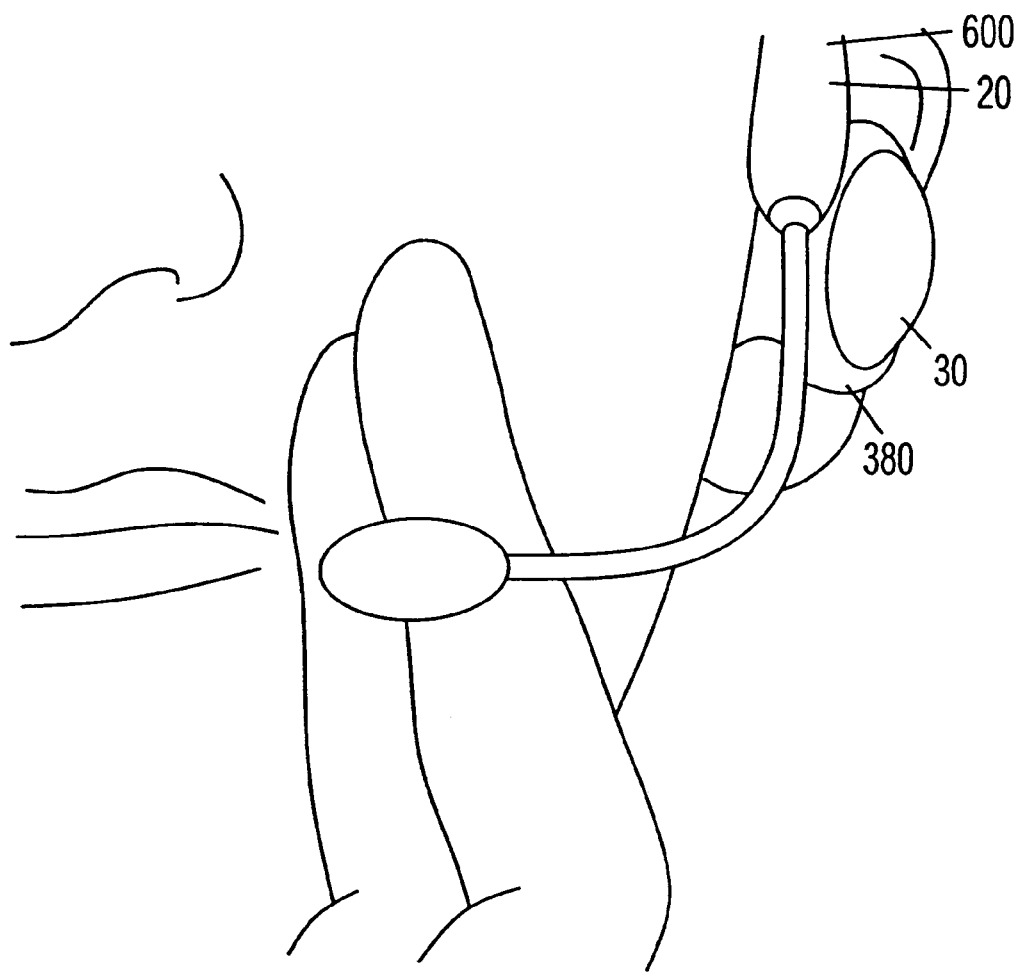
FIG. 6 illustrates the headset of the present invention, positioned over a wearer's ear.

FIG. 6 illustrates the headset 600 of the present invention, positioned over the wearer's ear. As described above, the earpiece 20 rests over the ear while the speaker module 30 rests over the pinna of the ear, with the speaker cushion 380 resting against the pinna.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A headset comprising:
   a. an adjustable earpiece for fitting the headset over an ear of a wearer, wherein the adjustable earpiece includes a rigid backbone and a ductile wire coupled to the rigid backbone, wherein a first elastomer is formed over the rigid backbone and the ductile wire to provide an asymmetrical U shape to the adjustable earpiece for comfortably fitting the communication headset over the ear; and
   b. means for generating sound coupled to the adjustable earpiece, wherein the means for generating sound rests over a pinna of the ear.

2. The headset according to claim 1 wherein the adjustable earpiece further includes a spring coupled to the rigid backbone and to the ductile wire such that the first elastomer is formed over the rigid backbone, the spring, and the ductile wire.

3. The headset according to claim 1 further comprising a cushion configured to fit over the means for generating sound, the cushion having a raised surface forming a compressible cavity between the means for generating sound and the raised surface, wherein the raised surface includes one or more apertures for directing sound into the ear, further wherein the cushion is compressible to facilitate stably positioning the means for generating sound against the pinna.

4. The headset according to claim 1 further comprising a flexible microphone boom coupled to the adjustable earpiece and a microphone enclosed in a hollow shell coupled to the flexible microphone boom, wherein the flexible microphone boom can be manipulated so that to place the hollow shell adjacent to a mouth of the wearer for speaking into the microphone.

5. The headset according to claim 1 wherein a second elastomer is formed over a portion of the adjustable earpiece, wherein the second elastomer has a durometer value greater than a durometer value of the first elastomer.

6. The headset according to claim 5 further including a flexible cabling jacket coupled to the second elastomer and extending away from the second elastomer, wherein the flexible cabling jacket includes a first pair of wires coupled to the microphone enclosed in the hollow shell and a second pair of wires coupled to the means for generating sound.

7. A headset comprising:
   a. an adjustable earpiece for fitting the headset over an ear of a wearer, wherein the adjustable earpiece includes a rigid backbone and a ductile wire coupled to the rigid backbone, wherein a first elastomer is formed over the rigid backbone and the ductile wire to provide an asymmetrical U shape to the adjustable earpiece for comfortably fitting the headset over the ear; and
   b. a speaker module for generating sound coupled to the adjustable earpiece, wherein the speaker module rests over a pinna of the ear.

8. The headset according to claim 7 wherein the adjustable earpiece further includes a spring coupled to the rigid backbone and to the ductile wire such that the first elastomer is formed over the rigid backbone, the spring, and the ductile wire.

9. The headset according to claim 7 further comprising a cushion configured to fit over the speaker module, the cushion having a raised surface forming a compressible cavity between the speaker module and the raised surface, wherein the raised surface includes one or more apertures for directing sound into the ear, further wherein the cushion is compressible to facilitate stably positioning the speaker module against the pinna.

10. The headset according to claim 7 further comprising a flexible microphone boom coupled to the adjustable earpiece and a microphone enclosed in a hollow shell coupled to the flexible microphone boom, wherein the flexible microphone boom can be manipulated so that to place the hollow shell adjacent to a mouth of the wearer for speaking into the microphone.

11. The headset according to claim 7 wherein a second elastomer is formed over a portion of the adjustable earpiece, wherein the second elastomer has a durometer value greater than a durometer value of the first elastomer.

12. The headset according to claim 11 further including a flexible cabling jacket coupled to the second elastomer and extending away from the second elastomer, wherein the flexible cabling jacket includes a first pair of wires coupled to the microphone enclosed in the hollow shell and a second pair of wires coupled to the speaker module.

13. A headset comprising:
   a. an adjustable earpiece for fitting the headset over an ear of a wearer, wherein the adjustable earpiece includes a rigid back bone and a ductile elongated member coupled to the rigid backbone;
   b. an elastomer formed over the rigid backbone and the ductile wire to provide an asymmetrical U shape to the adjustable earpiece; and
   c. a speaker module for generating sound, rotatably coupled to the adjustable earpiece.

14. The headset according to claim 13 further comprising at least one strain relief formed into the elastomer.

15. The headset according to claim 13 further comprising a flexible microphone boom coupled to the headset and a microphone module coupled to a distal end of the flexible microphone boom, wherein the flexible microphone boom can be manipulated for positioning the microphone module.

16. The headset according to claim 13 further comprising a cushion configured to fit over the speaker module.

17. The headset according to claim 15 further comprising a flexible cabling jacket coupled with to headset and extending away from the headset, wherein the flexible cabling jacket includes wires coupled for providing electronic communication with the microphone module and the speaker module.

18. A headset comprising:
   a. an adjustable earpiece for fitting the headset over an ear of a wearer, wherein the adjustable earpiece includes a rigid back bone and a ductile elongated element coupled to the rigid backbone;
   b. an elastomer formed over the rigid backbone and the ductile elongated element to provide an asymmetrical U shape to the adjustable earpiece;
   c. at least one strain relief formed into the elastomer;
   d. a speaker module for generating sound, rotatably coupled to the adjustable earpiece; and
   e. a flexible microphone boom coupled to the adjustable earpiece and a microphone module coupled to a distal end of the flexible microphone boom, wherein the flexible microphone boom can be manipulated for positioning the microphone module.

19. The headset according to claim 18 further comprising a cushion configured to fit over the speaker module.

20. The headset according to claim 18 further comprising a flexible cabling jacket coupled to the headset and extending away from the headset, wherein the flexible cabling jacket includes wires coupled for providing electronic communication with the microphone module and the speaker module.

* * * * *